Patented Apr. 21, 1931

1,802,155

UNITED STATES PATENT OFFICE

MARTIN MÜLLER-CUNRADI, OF LUDWIGSHAFEN-ON-THE-RHINE, AND ANNELIESE KOSSUTH, OF MANNHEIM-FEUDENHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

STABLE IRON CARBONYL COMPOSITION

No Drawing. Original application filed April 22, 1925, Serial No. 25,140, now Patent No. 1,722,076, and in Germany December 5 1924. Divided and this application filed October 11 1928. Serial No. 311,957.

This is a divisional application and relates to subject-matter which has been divided out from our copending application for patent Ser. No. 25,140 filed April 22nd, 1925, Patent No. 1,722,076 dated July 23, 1929, and for which I have filed applications in Germany B. 116940 December 5, 1924; Great Britain 11455 May 2, 1925, now Patent No. 260,639 sealed January 27, 1927; France 203114 May 1, 1925, now Patent No. 597517 published November 3, 1925; Italy 334.1239, May 11, 1925, now Patent No. 240009 granted July 20, 1925; Belgium 258699 April 28, 1925, now Patent No. 325,245 granted May 15, 1925; Canada 304,518 July 11, 1925, now Patent No. 262,600 granted July 13, 1926; Australia 13907, July 7, 1925, now Patent No. 2390725 granted July 7, 1925; Russia 33850/11393 August 31, 1926.

Iron carbonyl, as is known, whether by itself or dissolved in a diluent has the property of being sensitive to light by the action of which it is more or less rapidly altered with the formation of a voluminous precipitate.

We have found that the decomposition of iron carbonyl by light can be retarded or even avoided by the presence of certain compounds and that solutions of iron carbonyl in hydrocarbons or in mixtures of hydrocarbons containing such compounds have a high stability. As compounds capable of exerting such desirable influence we have found, for example, organic compounds having a substantially higher molecular weight than the solvent hydrocarbon and soluble or colloidally soluble in the mixture of iron carbonyl and the hydrocarbon or mixtures of hydrocarbons, the said substances of high molecular weight probably acting as protective colloids. Examples of such organic compounds probably acting as protective colloids are caoutchouc, adeps lanæ, naphthenic acids, also hydrocarbons of a moderately high molecular weight, for example heavy gasoline, or kerosene. Amounts of 0.1 per cent of these substances are usually effective and in some cases even 0.01 to 0.001 per cent will prove sufficient. In the case of kerosene very stable solutions of iron carbonyl in gasoline or benzine are obtained by adding so much kerosene that the mixture has a specific gravity 0.75. Several additions of suitable compounds may be made at the same time and the additions may be made either to the solutions intended for direct use, for example gasoline with about 0.3 per cent of iron carbonyl, or to more concentrated solutions of iron carbonyl as may be prepared for shipping or warehousing.

What we claim is:—

1. As a composition of matter a solution of iron carbonyl in a hydrocarbon in which the iron carbonyl is decomposable by exposure to light and an organic compound of considerably higher molecular weight than said hydrocarbon and soluble therein.

2. As a composition of matter a solution of iron carbonyl in gasoline in which the iron carbonyl is decomposable by exposure to light and an organic compound of considerably higher molecular weight than gasoline and soluble therein.

3. As a composition of matter a solution of iron carbonyl in a hydrocarbon in which the iron carbonyl is decomposable by exposure to light and up to about 0.1 per cent of an organic compound of considerably higher molecular weight than said hydrocarbon and soluble therein.

4. As a composition of matter a solution of iron carbonyl in gasoline in which the iron carbonyl is decomposable by exposure to light and up to about 0.1 per cent of an organic compound of considerably higher molecular weight than gasoline and soluble therein.

5. As a composition of matter a solution of iron carbonyl in hydrocarbons in which the iron carbonyl is decomposable by exposure to light and caoutchouc.

6. As a composition of matter a solution of iron carbonyl in gasoline in which the iron carbonyl is decomposable by exposure to light and caoutchouc.

7. As a composition of matter a solution of iron carbonyl in hydrocarbons in which the iron carbonyl is decomposable by exposure to light and up to about 0.1 per cent of caoutchouc.

8. As a composition of matter a solution of iron carbonyl in gasoline in which the iron carbonyl is decomposable by exposure to light and up to about 0.1 per cent of caoutchouc.

9. As a composition of matter a solution of iron carbonyl in a hydrocarbon in which the iron carbonyl is decomposable by exposure to light and a hydrocarbon of considerably higher molecular weight than the hydrocarbon first mentioned and soluble therein.

10. As a composition of matter a solution of iron carbonyl in gasoline in which the iron carbonyl is decomposable by exposure to light and a hydrocarbon of considerably higher molecular weight than gasoline and soluble therein.

11. As a composition of matter a solution of iron carbonyl in a hydrocarbon in which the iron carbonyl is decomposable by exposure to light and about 0.1 per cent of a hydrocarbon of higher molecular weight than the hydrocarbon first mentioned and soluble therein.

12. As a composition of matter a solution of iron carbonyl in gasoline in which iron carbonyl is decomposable by exposure to light and about 0.1 per cent of a hydrocarbon of higher molecular weight than gasoline and soluble therein.

In testimony whereof, we affix our signatures.

MARTIN MÜLLER-CUNRADI.
ANNELIESE KOSSUTH.